United States Patent [19]
Martuch

[11] 3,849,929
[45] Nov. 26, 1974

[54] BUOYANT FISHING LINE
[75] Inventor: Leon L. Martuch, Midland, Mich.
[73] Assignee: Scientific Anglers, Inc., Midland, Mich.
[22] Filed: Jan. 27, 1972
[21] Appl. No.: 221,148

[52] U.S. Cl.............. 43/44.98, 87/1, 117/138.8, 161/47, 161/160, 161/176
[51] Int. Cl............................. A01k 91/00
[58] Field of Search ........ 161/151, 160, 161, 175, 161/176, 47; 87/1; 156/77–79; 43/44.98; 117/138.8

[56] References Cited
UNITED STATES PATENTS
| 2,748,525 | 6/1956 | Volz | 161/175 |
| 2,862,282 | 12/1958 | Beebe | 161/175 |
| 3,043,045 | 7/1962 | Martuch | 43/44.98 |
| 3,486,266 | 12/1969 | Richardson et al. | 161/175 |
| 3,523,034 | 8/1970 | Howald | 161/175 |
| 3,546,060 | 5/1967 | Hoppe et al. | 161/161 |

Primary Examiner—George F. Lesmes
Assistant Examiner—James J. Bell
Attorney, Agent, or Firm—Laurence, Laurence & Neilan

[57] ABSTRACT

A buoyant fishing line comprising a foamed core surrounded by a filamentous line with or without being coated with a flexible surface layer.

9 Claims, 3 Drawing Figures

BUOYANT FISHING LINE

BACKGROUND OF INVENTION

This invention relates to an improved buoyant fishing line. This invention further relates to an improved buoyant fishing line having a foamed core. This invention still further relates to a process for preparing the improved buoyant fishing line of this invention.

A good buoyant line for fly casting should have, besides buoyancy, at least the following properties: (1) weight sufficient for casting; (2) little visibility for the fish; (3) flexibility; and (4) retain its buoyancy with use.

Since the lure usually has little weight, the propelling force for a cast is generated initially in the line and then transmitted to the leader and lure. The fishing line therefore should have sufficient weight for the force to develop and be transmitted.

The diameter of the line should be relatively small to reduce its visibility to the fish and avoid friction with the guides during the cast. A visible line will distract the fish away from the lure.

A good line should also be flexible and retain its flexibility. If the line is not sufficiently flexible it will not generate sufficient energy, nor transmit the energy necessary for proper casting.

Retention of buoyancy is another feature required for a good line. Many lines, during use, develop cracks in the surface coating permitting water to enter the line decreasing the buoyancy of the line and also weakening or breaking the bond between the line and the coating. The line therefore becomes useless after a relatively short period of use.

Many attempts have been made to overcome these disadvantages, most without success. The lines developed as a result of these attempts either did not overcome all the disadvantages or developed new disadvantages in the process.

Increased buoyancy of a line by the incorporation of microbeads or foaming of the surface coating has been attempted. Both methods increase the line's diameter decreasing its flexibility and increasing its visibility to the fish. The surface coating is also weakened by the incorporation of particles, thus permitting cracking to occur and seepage of water into the line's center.

The incorporation of buoyant material in a surface coating cannot be used however to prepare a buoyant fishing line which does not require the additional weight imparted by the surface coating.

It is thus an object of this invention to overcome the disadvantages enumerated above.

Another object of this invention is an improved buoyant fishing line.

Still another object of this invention is an improved buoyant fishing line having a foamed core.

Still another object of this invention is an improved buoyant fishing line having a foamed core but no surface coating.

These and other objects of this invention will be apparent from the description of the drawings and the following discussion.

In the preparation of commercial fishing lines a filamentous material, such as nylon, dacron, silk and the like, is braided, twisted or laid side by side to provide the bulk of the line and its tensile strength. In most lines the filamentous material is braided and machines for the braiding of this material are commercially available. Regardless of the process used for preparing the fishing line, a core is usually formed within the filamentous material. It is this core which, according to the present invention, is filled with a foamed material and which imparts the improved buoyancy to the line.

Figure 1:
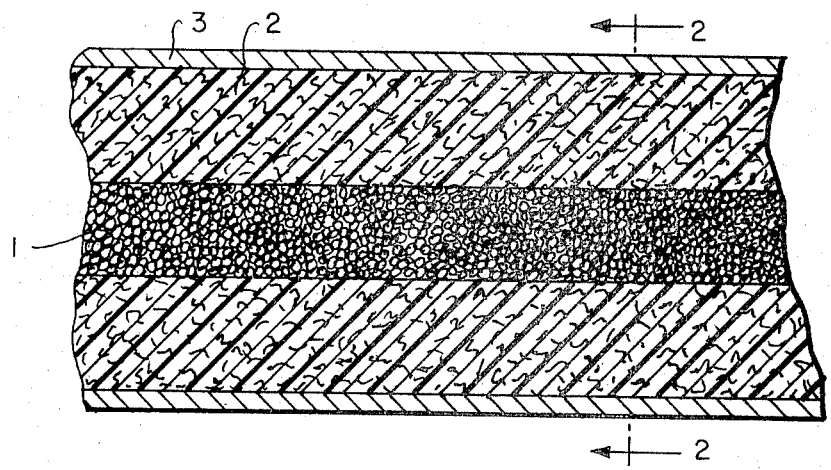
FIG. 1 is a drawing showing a longitudinal section of a coated fishing line.
Figure 2:
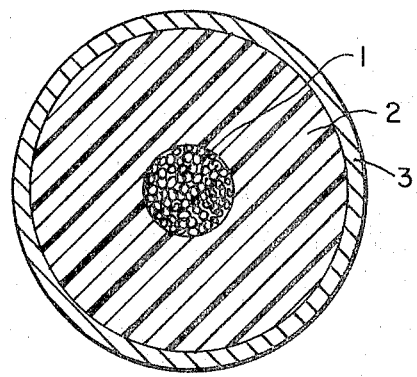
FIG. 2 is a cross-sectional view of a fishing line, along the line 2—2 of FIG. 1.

In FIGS. 1 and 2, the foamed core material 1 is shown surrounded, or encased, in the filamentous line material 2.

Figure 3:
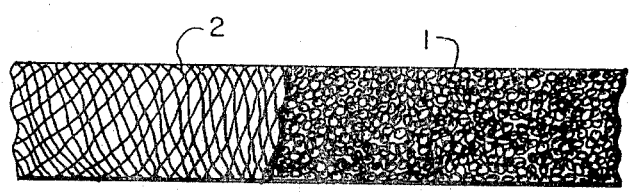
FIG. 3 is a drawing showing a view with parts broken away of a fishing line.

In FIG. 3, the filamentous line material is shown in a braided form which is the preferred form for the line material. It is also preferred that the line material be nylon.

The core material 1 may be a monofilament or filaments of foamed material or filamentous material (such as thread) impregnated or coated with foamed material.

The surface coating 3 of the line is any of the conventional coating known to those skilled in this art. The coating may be applied directly to the line or there may be an intermediate adhesive (primer) layer. It is preferred to have the intermediate adhesive layer. This improves the adherence of the surface coating to the line material. The primer should be relatively non-viscous liquid which is compatible with the plastisol used as the surface coating. Suitable primers are vinyl chloride - vinyl acetate copolymer in methyl isobutyl ketone or acrylonitrile-butadiene copolymer in methyl-ethyl or methyl-isobutyl ketone.

After the primer has been applied and the solvent evaporated, the surface coating plastisol is applied to the line.

The polymeric component of the plastisol may be vinyl chloride or vinyl chloride copolymers. The polymer is mixed with one or more plasticizers and a stabilizer.

Suitable plasticizers for vinyl chloride polymers include di-octyl adipate, di-2-ethylhexyl phthalate, dicapryl phthalate, tricresyl phosphate and trioctyl phosphate.

Suitable stabilizers include lead, zinc and cadmium soaps and epoxides. The stabilizer is included to combine — pick up — with any hydrogen chloride which may be liberated from the polyvinyl chloride. Liberated hydrogen chloride, if not absorbed, will deteriorate the surface coating.

The amount of plasticizer present in the plastisol varies dependent upon the polymer content but is usually in the range of about 30 to 70 parts by weight of plasticizer per 100 parts by weight of polyvinyl chloride.

After the line has been coated with the plastisol it is "cured" by heat treatment at a temperature in the range of about 350° to 380°F.

A typical surface coating plastisol formulation, in parts by weight, is as follows:

| | |
|---|---|
| Polyvinyl chloride (Geon 121) | 100 |
| Dioctyl adipate | 53 |
| Epoxidized tall oil (Flexol E P8) | 10 |
| Lead soap | 3 |

A typical plastisol formulation for a fishing line has a specific gravity in the range of about 1.2 to 1.3. In order to have a buoyant fishing line, the resulting specific gravity must be reduced. As was discussed previously, the specific gravity has, in the past, been reduced by the addition of microspheres of air in the plastisol and thus in the surface coating. The disadvantages of this procedure have been enumerated.

It has now been found that an improved buoyancy and an improved line is obtained by the addition of a foamed material to the core of the line. It should be pointed out that the definition of core as used in this specification and appended claims refers to that area within the line proper, such as the area within a braided nylon line. In the prior art the term core refers to the braided nylon line itself.

In the process for the production of a fishing line, such as the braiding of nylon filaments or fibers, a hollow area within the center of the line is formed. It is this hollow area which is referred to as the core in this application and which is substantially occupied by a foamed material. The diameter of this core varies with the means of producing the line. It is usually in the range of about 0.005 to 0.015 inch.

In most commercial lines, this core remains empty and any air in the core aids in the buoyancy of the line. However, when a crack develops in the surface coating, any water which enters the line eventually reaches the core and fills the core. This decreases the buoyancy of the line because (1) the air in the core is displaced by water, and (2) an added weight, water, is supplied to the line. Because of the small diameter of the core, it is extremely difficult to dry out the water in the core. The line, therefore, rapidly becomes useless.

The presence of a foamed material, according to this invention, in the core prevents any significant amount of water to enter the core. In addition, since the air is "trapped" within the foamed core material it cannot be displaced. Buoyancy of the line is thus maintained.

The foamed material, which substantially fills the core, can either be a thread material impregnated or coated with foamed material, or be filaments of foamed material.

In either case, the material may be foamed prior to incorporation in the line or after incorporation in the line.

As was discussed previously, in the production of a fishing line, a surface coating, when used, is applied to the line in the form of a plastisol which is then cured. It is possible to take advantage of this curing step to also foam the core material. Many synthetic compositions are available which will expand upon heating forming a cellular structure. This material incorporated within the core will expand during the curing (heating) step and substantially occupy the core space.

The other process utilizes a foamed material and braids the line around the foamed material. In this process, the diameter of the foamed material may be slightly larger than the normal diameter range of the inner core of a fishing line. The line as it is being braided will compress the foamed material thus ensuring that the core will be substantially occupied by the foamed material.

Preparation of a thread, such as cotton or nylon, impregnated with a foamable material can be prepared utilizing conventionally known processes, such as described in U.S. Pat. No. 3,479,811.

One of the processes comprises the feeding of the thread to a tank containing a foamable coating mixture. As the thread passes through the coating mixture, the coating adheres to the thread. The amount of coating which will adhere to the thread can be regulated by the speed with which the thread is passed through the coating mixture. Another means by which the amount of coating adhering to the thread is regulated is by passing the thread, after it leaves the tank, through an adjustable orifice. The excess coating is removed during the passage through the orifice.

This procedure provides mainly a surface coating on the thread. However, depending upon the viscosity of the mixture, some impregnation occurs. The more fluid the liquid, the greater the degree of impregnation.

Coating mixtures of foamable material are commercially available or easily prepared. Polystyrene beads are available in bead diameters of 0.8 mm and less. The beads containing a low boiling aliphatic solvent and foaming occurs at about 200°F.

Vinyl and polyethylene beads and pellets are also commercially available. The foaming agent varies and may be a chemical or a low boiling solvent.

Other beads and pellets and other diameters are also available.

These are just a small number of the commercial available products which may be utilized.

The coated and/or impregnated thread is then dried to remove the solvent. If the material is to be foamed prior to incorporating into the line, the removal of solvent can be conducted at a higher temperature or under conditions which would also foam the coating mixture. If foaming is to be delayed then the solvent is removed under milder temperature or conditions to prevent foaming.

In either case, the resultant thread is then encompassed within a fishing line. This may be accomplished by passing the thread up through the center of a braiding machine and have the line braided around the coated thread. Machines capable of accomplishing this process are commercially available or can be easily adapted.

The line with its foamed or foamable core is then coated with a primer and finally the surface coating.

As was discussed previously, most line coatings are cured at elevated temperatures. This curing step will also foam the core material if necessary. It should be remembered that the temperature in the core will be less than at the surface of the line. It may thus be necessary to cure the surface coating at a temperature in the upper portion of the range in order to supply sufficiently high temperatures to cure the core material. It is not necessary, and in many instances it will not be required, that the core material and surface material require the same temperature for foaming and curing, respectively.

Foaming of the core material and curing of the surface coating at the same time requires a better control over operating conditions than required when only curing of the surface coating occurs.

In addition, there always exists the possibility that during the foaming of the core material some gas might escape and rupture or blister the surface coatings. For these reasons it is preferable that the core material be foamed prior to being encompassed by the line material.

The procedure for the preparation of a buoyant line utilizing as a core material filaments or a filament of a foamed or formable material is basically similar to that previously discussed for the coated thread. The main difference between the two processes resides in the preparation of the core material. Foamed or foamable filaments are commercially available or easily prepared by known methods and do not have to be coated as discussed previously for the thread. Their incorporation into the fishing line and subsequent treatment, if necessary, is similar to the coated thread operation already discussed.

In another embodiment of this invention, the buoyant fishing line has the same buoyant filamentous center and line as previously discussed but does not have a flexible outer surface coating. This type of line is desirable where the buoyancy feature is desired but the added weight due to the surface coating is not needed or desired.

The process for preparing this type of line is identical with the previous discussion. Since there is no surface coating, foaming of the core can be delayed until after the line has been formed around the foamable core material.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

I claim:
1. A buoyant fishing line dimensioned to be suitable for fly casting and including a flexible castable filamentous line having a braided configuration with an open center, a foamed thread-like core substantially completely occupying said open center and extending the length thereof to impart buoyancy to said fishing line, and a flexible surface coating on said filamentous line.

2. A buoyant fishing line according to claim 1, further comprising a primer coating interposed between said filamentous line and said flexible surface coating.

3. A buoyant fishing line according to claim 1, wherein said core is a thread incorporating foamed material.

4. A buoyant fishing line according to claim 1, wherein said core is comprised of filamentous foamed material.

5. A buoyant fishing line according to claim 1, wherein said filamentous line is a braided nylon line and wherein said flexible surface coating is comprised of polyvinyl chloride, and further comprising a primer on the surface of said nylon line beneath said flexible surface coating.

6. A buoyant fishing line according to claim 4 wherein said foamed core is a monofilament foamed material.

7. A buoyant fishing line according to claim 1 wherein said filamentous line is selected from the group consisting of nylon, dacron and silk.

8. A buoyant fishing line according to claim 7 wherein said filament is nylon.

9. A buoyant fishing line according to claim 8 wherein said foamed core is a thread incorporating foamed material.

* * * * *